E. B. JACOBSON.
BUSHING REMOVER.
APPLICATION FILED APR. 11, 1919.
1,322,497.
Patented Nov. 18, 1919.
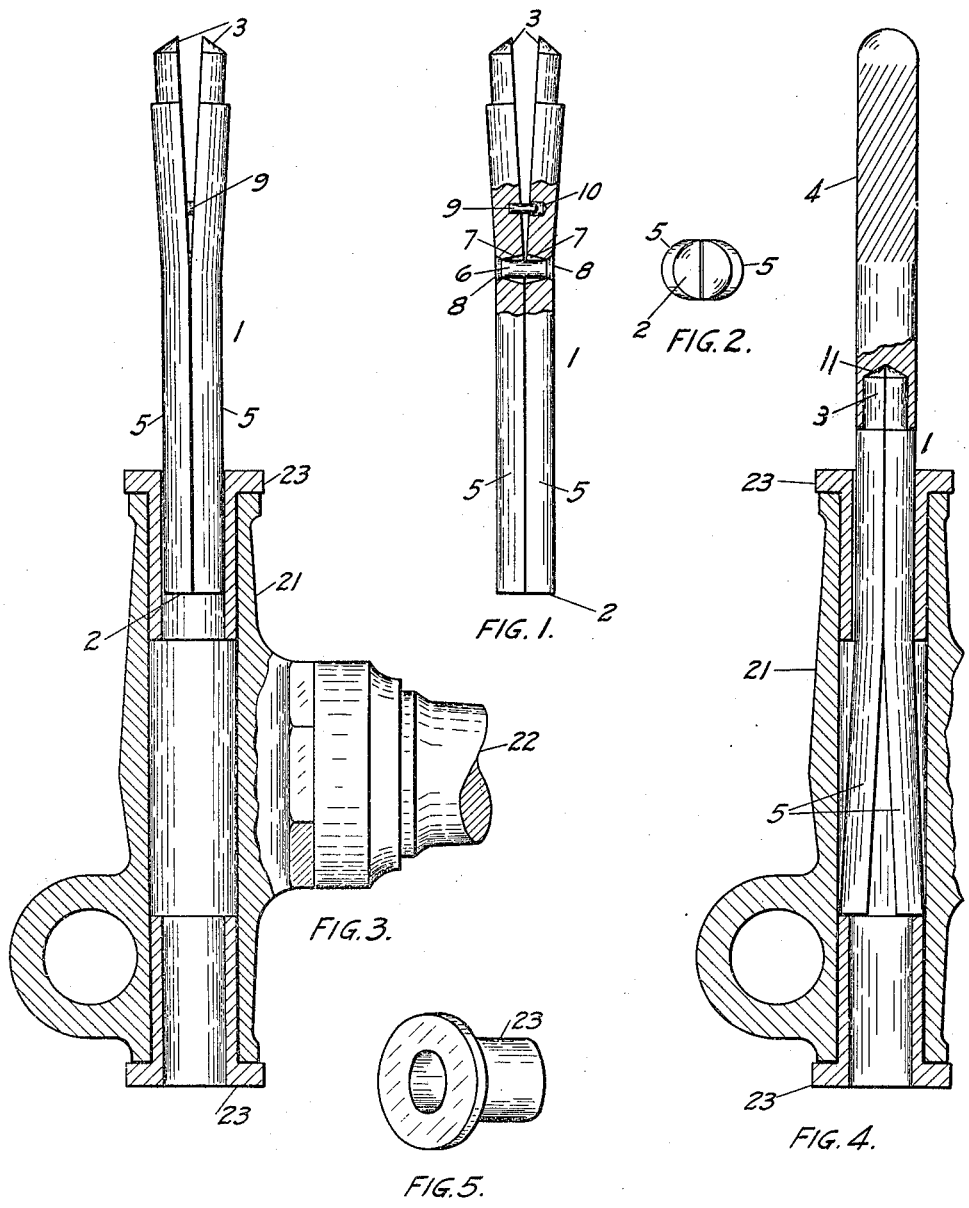
WITNESSES
Lela M. Cole
Josie C. Harney
INVENTOR,
Edward B. Jacobson,
BY
Thos. J. Winterey
ATTORNEY

UNITED STATES PATENT OFFICE.

EDWARD B. JACOBSON, OF PITTSFIELD, MASSACHUSETTS, ASSIGNOR TO J AND B MANUFACTURING COMPANY, OF PITTSFIELD, MASSACHUSETTS, A CORPORATION OF MASSACHUSETTS.

BUSHING-REMOVER.

1,322,497.      Specification of Letters Patent.      Patented Nov. 18, 1919.

Application filed April 11, 1919. Serial No. 289,284.

*To all whom it may concern:*

Be it known that I, EDWARD B. JACOBSON, a citizen of the United States, residing at Pittsfield, in the county of Berkshire and State of Massachusetts, have invented certain new and useful Improvements in Bushing-Removers, of which the following is a specification.

This invention relates to special hand tools, and, more particularly, to an implement for unseating and removing worn bushings requiring replacement.

The primary object of the invention is the provision of simple and effective mechanism by which one of a pair of bushings seated in opposite ends of a tubular body of uniform bore may be readily removed without causing injury to its mounting or to the remaining bushing. Among the several advantages appertaining to the present implement are the simplicity of its structure and application, which does not require preliminary adjustment or auxiliary attachments.

The novelty of the invention resides in the construction, combination, arrangement, and operation of the component parts, as hereinafter described and shown.

Referring to the accompanying drawings, which illustrate a preferred form of embodiment of the invention, Figure 1 is a side elevation of the drifting tool with the lower ends arranged in the closed position, a portion of its length being shown in section to disclose the jointed connection of the complementary parts; Fig. 2, a bottom view of the same; Fig. 3, a longitudinal sectional view of a spindle-body and bushings mounted therein, with the drifting tool partly introduced through one end; Fig. 4, a view similar to Fig. 3, showing the assembled device fully adjusted for operation within the spindle-body; and Fig. 5, a perspective view of one of the bushings normally mounted in the spindle-body.

The invention comprises a drifting tool and a separate detachable holder.

The drifting tool 1 constitutes the portion introduced into the spindle body 21, and in process of manufacture is preferably constructed of a suitable length of round steel rod having a plane face 2 at its lower end and a reduced extension 3 at its upper end for the support of a detachable holder 4. Said rod is divided lengthwise into two equal parts, designated as fingers, 5, 5, which are semi-circular in cross-section and of uniform dimensions throughout their length. The fingers 5, 5, are movably secured together at a point somewhat above their middle by a fulcrum pin 6 extending through oppositely arranged transverse openings 7, 7, and secured in position by heads 8, 8, provided at both ends and adapted to seat in corresponding enlargements of the openings 7, 7, at their outer ends. The walls of the openings 7, 7, between the heads of the pin 6 are beveled to provide suitable clearances around the body of the pin for the purpose hereinafter related.

The fingers 5, 5, are bent inward at the point of attachment to provide a predetermined permanent angular relation of the upper portion of each finger to its lower portion and in such manner as to preserve the plane faces of both portions, whereby, in spreading corresponding ends relatively apart, the opposing faces of the opposite ends are brought into engagement throughout their length, and vice versa. Seated on the inner face of one of the fingers 5 preferably at a point above the pin 6 is a stationary guide-pin 9 extending beyond the supporting finger and into a recess 10 of appropriate size provided on the inner face of the opposite finger to serve as a guide-way for opposing lateral movement of the fingers on the pin 6 and hence to maintain the fingers in true alinement with each other.

The clearances provided by the openings 7, 7, around the middle or body portion of the pin 6 permit the alternate spreading and closing action of corresponding ends of the fingers necessary for introducing and withdrawing the drifting tool into and from the spindle-body 21.

The holder 4 is preferably constructed of a suitable length of round rod similar to the stock employed in the construction of the drifting tool and is provided at its lower end with a recess or socket 11 adapted to receive the reduced upper ends of the fingers 5, 5, when in closed position and is of corresponding size. When mounted on the drifting tool, the holder 4 operates as a securing member to hold the upper ends of the fingers 5, 5, in closed position and consequently to maintain the spread relation of the lower ends of the fingers.

The spindle-body 21, herein illustrated and for which my invention is particularly, although not exclusively, designed, is an upright tubular member provided with a lateral arm or spindle 22 upon which a vehicle wheel is mounted. Said spindle-body 21 constitutes an adjustable bearing rotatively mounted on a hinge bolt (not shown) secured to the forward axle of the vehicle and carries an exteriorly shouldered bushing 23 of brass driven into the bore at each end to serve as a bearing face. To remove the bushings 23, 23, which are subject to rapid wear and require frequent replacement, the drifting tool 1 is inserted in one end of the spindle-body 21 in the position illustrated in Figs. 1, 2, and 3, the lower ends of the fingers 5, 5, being in the closed position. When inserted as far as the inner end of the bushing 23 at the opposite end of the spindle-body 21, the lower ends of the fingers are spread apart to seat on the rim at the inner end of the bushing by pressing together the upper ends of the fingers 5, 5, assuming the position shown in Fig. 4. The holder 4 is then mounted, as shown, on the reduced extension 3 to act as a clamp for the fingers and as a medium to which force may be applied to drive the bushing out. The implement is then removed by the reversal of these operations, when the remaining bushing may be removed in the same manner.

I claim:

1. In a hand tool, a pair of angular arms arranged in opposite relation in the same plane, corresponding ends of the arms being adapted to be moved toward and away from each other, each of said arms having a transverse opening in its angle arranged opposite the opening in the other arm, each of the openings being larger in diameter at its ends than at its middle, and a pin for movably securing the arms together and extending through said openings and having a head at each of its ends seated in the corresponding arm.

2. In a hand tool, a pair of arms arranged in opposite relation in the same plane, each of the arms having an internal angle in its length opposite the angle in the other arm and a transverse opening through such angle, and means, including a rivet-pin extending through the openings in said arms, for securing the arms together in movable relation to each other and permitting corresponding ends of the arms to be moved toward and away from each other, said openings being enlarged at opposite points to provide a clearance about the pin at its middle.

3. A bushing remover including a pair of angular arms secured together at their angles in the same plane, corresponding ends of the arms being arranged to be moved into and out of engagement with each other, securing means, including a pin for riveting the arms together in movable relation to each other, and means, in addition to the securing means, and including a guide-pin for maintaining the arms in the same plane.

4. A bushing remover including a pair of angular arms movably secured together at their angles in the same plane, corresponding ends of the arms being arranged to be moved into and out of a closed position, said arms having complementary reduced extensions at their upper ends, and a detachable holder adapted to be mounted on said extensions when in the closed position and having a recess in one end for seating said reduced arm extensions.

In testimony whereof I hereunto affix my signature in the presence of two witnesses.

EDWARD B. JACOBSON.

Witnesses:
   Jno. J. Whittlesey,
   Lela M. Cole.